United States Patent [19]
Hendriks

[11] 4,272,691
[45] Jun. 9, 1981

[54] GENERATING ELECTRICAL PULSES

[75] Inventor: Jozef H. Hendriks, Wakefield, Mass.

[73] Assignee: Teradyne, Inc., Boston, Mass.

[21] Appl. No.: 958,713

[22] Filed: Nov. 8, 1978

Related U.S. Application Data

[63] Continuation-in-part of Ser. No. 915,396, Jun. 14, 1978, abandoned.

[51] Int. Cl.³ .................. H03K 5/12; H03K 17/04; H03K 17/08
[52] U.S. Cl. .................................. 307/268; 307/253; 307/275; 307/300
[58] Field of Search ............... 307/253, 254, 268, 275, 307/300

[56] References Cited

U.S. PATENT DOCUMENTS

| | | | |
|---|---|---|---|
| 3,240,952 | 3/1966 | Irmisch | 307/275 |
| 3,350,572 | 10/1967 | Morgan | 307/254 X |
| 4,012,644 | 3/1977 | Blincoe | 307/275 |
| 4,061,931 | 12/1977 | Boschert | 307/300 |

Primary Examiner—John Zazworsky

[57] ABSTRACT

Electrical circuitry for generating pulses having sharp dropoff characteristics. The circuitry comprises a power transistor, a voltage source connected to supply current through the collector-emitter circuit of the transistor, a degenerative feedback loop connected between the emitter and the base of the transistor, switching means to initiate turn-on and turn-off of the transistor, and means for activating the loop upon initiation of turn-off.

15 Claims, 2 Drawing Figures

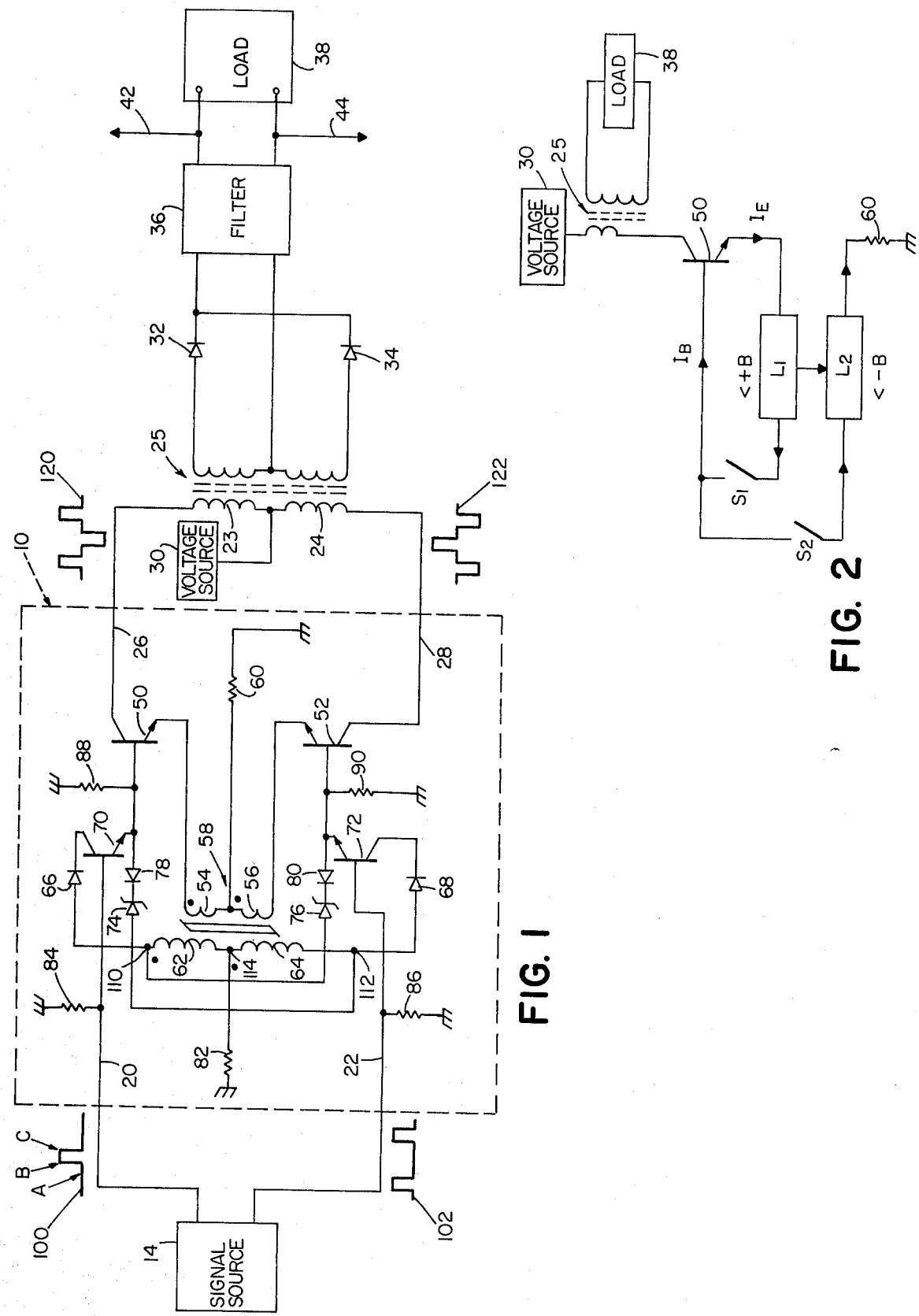

GENERATING ELECTRICAL PULSES

BACKGROUND OF THE INVENTION

This application is a continuation in part of my co-pending U.S. application Ser. No. 915,396, filed June 14, 1978 now abandoned.

This invention relates to electrical circuitry for generating pulses with sharp dropoff characteristics, e.g., in a switching power regulator for providing regular frequency, square pulses from a DC source.

Generally speaking in such circuits it is desired to provide a large base drive current to rapidly turn on a power transistor, and then to provide a reverse bias to the transistor base to enhance turn-off. One example is described in *Base Drive and Snubber Techniques for Minimization of Transistor Switching Losses* by J. Chopra and D. Roark in the March 1975 Proceedings of the First National Solid State Power Conversion Conference, in which turn-on is assisted by regenerative base drive feedback from the transistor output, using a current transformer, and turn-off is assisted by using a charge stored in a capacitor, to reverse bias the transistor.

It is also desirable to provide a means of limiting transistor output current to prevent burn-out failures.

SUMMARY OF THE INVENTION

The present invention features use of a degenerative feedback loop to reverse bias the transistor during turn-off and actively draw stored base charge from the transistor. An element detects the initiation of turn-off and activates the loop, whereupon the current to the transistor base is reversed in direction, decreasing the output of the transistor.

In preferred embodiments the element detecting initiation of turn-off is also sensitive to the magnitude of emitter current so as to activate the loop to drain current from the transistor base when the emitter current exceeds a safe level, thereby preventing burn-out of the power transistor and saturation of any output transformer controlled by the power transistor; the transistor is connected in two feedback loops having positive and negative transfer functions, respectively, and a switch is closed to cause current flow regeneratively into the base during turn-on, and is opened to cause current to flow degeneratively out of the base during turn-off. Also, in these embodiments, the two loops share a transformer, one side of which is connected to the transistor emitter. The other side of the transformer has one winding in the regenerative loop to, in effect, apply a current proportional to the emitter current to the base when the switch is closed, and a second winding in the degenerative loop, to produce the reverse bias and current flow in response to the induced voltage change that occurs in the transformer when the switch is opened to initiate turnoff. Current to or from the base is thus always proportional to and derived from the transistor output, and the switch can be selected for minimum power dissipation. Operation is efficient even with low level loads, and the circuit can use non-critical, inexpensive components, including, in a most preferred push-pull amplifier configuration, a highly efficient toroidal transformer. When two power transistors are connected in a push-pull circuit, the current limiting function performed by the degenerative loop has the advantage of saving the remaining transistor when one of the pair fails.

DESCRIPTION OF THE PREFERRED EMBODIMENT

We turn now to the circuitry and operation of a preferred embodiment of the invention, after first briefly describing the drawings.

DRAWINGS

FIG. 1 is a schematic diagram of a switching power regulator having a push-pull amplifier embodying the invention.

FIG. 2 is a block diagram illustrating the operation of one of the amplifier circuits of FIG. 1.

CIRCUITRY

Referring to FIG. 1, push-pull or double ended amplifier 10 is connected to a high frequency signal source 14 via lines 20 and 22, and to input windings 23 and 24 of output transformer 25 via lines 26 and 28. DC voltage source 30 is connected to the inner ends of windings 23 and 24. The output of transformer 25 is connected through rectifying diodes 32 and 34 and filter 36 to load 38. Feedback connections 42 and 44 are provided through a suitable servosystem (not shown) to signal source 14 for regulation of the output by pulse width modulation.

Power transistors 50 and 52 are provided in the two amplification circuits that make up amplifier 10. Each transistor has its collector connected to an output line 26, 28, and its emitter connected to an outside end of a winding 54, 56 of toroidally wound transformer 58. The inner ends of windings 54 and 56 are grounded through current limiting resistor 60. Windings 62 and 64 of transformer 58 have their outer ends (i.e., points 110 and 112) connected through diodes 66 and 68 to the collectors of transistors 70 and 72. Point 110 is also connected to the emitter of transistor 72 and the base of transistor 52 through zener diode 76 and diode 80. Point 112 is connected to the emitter of transistor 70 and the base of transistor 50 through zener diode 74 and diode 78. The inner ends of windings 62 and 64 are grounded through resistor 82. The bases of transistors 70 and 72 are connected to input lines 20 and 22, from which resistors 84 and 86 lead to ground. Resistors 88 and 90 are connected between the bases of transistors 50 and 52 and ground.

In the embodiment described, DC voltage source provides 25 to 50 volts and signal source 14 drives double-ended amplifier 10 at 16 KHz to supply 5 volts DC at up to 10 amperes to load 38. Transformer 25 is comprised of an Indiana General IR 8217 core having 50 turns in each primary winding, i.e. windings 23, 24, and 14 turns in each secondary winding. Transformer 58 is comprised of an Arnold T8043 core with windings 54 and 56 having 6 turns and windings 62 and 64 having 60 turns. Transistors 50 and 52 are Motorola SJ2305's and transistors 70 and 72 are Motorola MPS3646's. Diodes 74 and 76 are IN751A's, diodes 66, 68, 78 and 80 are General Electric DA1814's or Unitrode NDP200's, and diodes 32 and 34 are IN6096's. Resistors 88 and 90 are 100 ohms, resistors 84 and 86 are 1000 ohms, resistor 60 is 0.2 ohms and resistor 82 is 2 ohms; resistors 88 and 90 are ½ watt while all others are ¼ watt and all resistors are 5% film resistors. Signal source 14 is a Silicon General SG2524 and operates as a pulse width controller.

OPERATION

The operation of the amplification circuit including transistor 50 is illustrated by FIG. 2. A regenerative feedback loop L1 runs from the emitter of transistor 50, through windings 54 and 62 of transformer 58, and through diode 66 and transistor 70, which acts as switch S1, to the base of transistor 50. A degenerative feedback loop L2 shares transformer winding 54 and continues through winding 64 and the combination of zener diode 74 and diode 78, which together act as switch S2, to the base of transistor 50.

The waveforms travelling over lines 20, 22, 26, and 28 are shown in FIG. 1. As portion A of waveform 100 enters the base of transistor 70 that transistor will be driven into its cut-off, or non-conducting state. Transistor 50 will thus receive no base drive current and will also be in its cut-off state. Resistors 84 and 88 drain base leakage current from the transistors.

When waveform 100 begins to go positive in voltage at point B, current will begin to flow into the base of transistor 70, switching that transistor to its conducting state (i.e., closing switch S1). Current will flow out of the emitter of transistor 70 and into the base of transistor 50, initiating turn-on of the latter. Current will begin to flow from voltage source 30 through winding 23 of transformer 25, transistor 50, winding 54 of transformer 58, and resistor 60 to ground. The current flowing in winding 54 will induce a voltage across windings 62 and 64 of transformer 58 and point 110 will go positive and point 112 negative with respect to point 114. Current will begin to flow in winding 62, out through point 110 and through diode 66 and transistor 70 into the base of transistor 50, causing the current flowing from source 30 through transistor 50 and winding 54 to increase. The current gain around loop L1 is greater than unity, producing the desired regenerative, positive feedback.

Input signal 100 thus serves primarily to initiate the feedback operation. The regenerative feedback increases the base drive to transistor 50 in proportion to the increasing transistor output, thereby decreasing turn-on time and making the rise time of output waveform 120 short and primarily dependent upon load 38. I.e., the current flowing in winding 23 of transformer 25 will be a function of the reflected impedance in winding 23 due to load 38, and the current flowing in loop L1 will thereby be a function of that load. Because the current gain in loop L1 is greater than unity, the base current to transistor 50 will always exceed that required for the current flowing through winding 23, so that transistor 50 will always be in saturation once it is turned on. Transistor 50 will thereby always present the minimum resistance to the current in winding 23 and the maximum signal will be supplied on line 26.

When waveform 100 begins to decrease in voltage at point C, the current into the base of transistor 70 will decrease, thereby driving transistor 70 into cut-off (i.e., opening switch S1) and interrupting the base current into transistor 50 from winding 62. The interruption of the current through winding 62 will cause the voltages across windings 62 and 64 to increase until the voltage at point 112 goes sufficiently negative with respect to point 114 and the base of transistor 50 to exceed the threshold voltage of zener diode 74. Diodes 74 and 78 will begin to conduct and current will be drawn from the base of transistor 50 through winding 64. This in turn will cause the current flowing through transistor 50 and winding 54 to decrease, producing the desired degenerative feedback through loop L2, actively drawing the stored base charge out of transistor 50, further decreasing the turn-off time of transistor 50 and enhancing the dropoff characteristic of waveform 120.

If the emitter current of transistor 50 should rise above a safe level, i.e., to a level exceeding the power dissipation capability of transistor 50, resistor 60 causes the voltage at the base of transistor 50 to rise until the threshold voltage of zener diode 74 is exceeded, thereby activating the degenerative loop and draining away excessive base current. Both regenerative and degenerative loops operate simultaneously in this current-limiting mode, with excessive base current from the regenerative loop being drained away by the degenerative loop. The threshold voltage of zener diode 74 can thus be exceeded either by a drop in the voltage at point 112, during turn-off of transistor 50, or by an increase in the voltage at the base of transistor 50, when excessive current is flowing through the collector-emitter leg of the transistor.

Transistor 52 and its associated elements operate in the same way to produce output 122. Overall, transistors 50 and 52 operate alternately due to a 180° phase shift between input signals 100 and 102. The voltages induced across windings 62 and 64 via winding 56 will be equal in magnitude to, but of opposite polarity as, the voltages induced thereacross via winding 54; the two regenerative loops and the two degenerative loops thus complement each other in operation. If one of transistors 50, 52 fails, the other remains protected from burnout by the current limiting function of the degenerative loop.

Outputs 120 and 122 are combined in transformer 25, the output of which is then rectified and filtered to produce the desired DC voltage.

Other embodiments are within the following claims. E.g., diodes 74, 78 and 76, 80 could be replaced with a double anode zener diode, and a Schottky Baker clamp diode could be connected between the bases and collectors of transistors 70, 72 to eliminate virtually all of the storage time of those transistors during turn off.

What is claimed is:

1. Electrical circuitry for generating pulses having sharp dropoff characteristics, comprising
    a power transistor,
    a voltage source connected to supply current through the collector-emitter circuit of said transistor,
    a degenerative feedback loop connected between the emitter and the base of said transistor,
    switching means connected to the base of said transistor to initiate turn-on and turn-off of said transistor, and
    means for activating said loop upon initiation of turn-off,
    wherein said means for activating said loop includes means responsive to the current flowing through the collector-emitter circuit of said power transistor so that when said transistor is turned on and current through it exceeds a predetermined value, said loop is activated thereby draining away base current from said transistor.

2. The circuitry of claim 1 wherein said means for actuating said loop includes
    means for raising the voltage at the base of said power transistor in proportion to the emitter current of said transistor, and
    means responsive to the base voltage to activate a current path connecting the base to ground when the base voltage exceeds a level corresponding to said predetermined value of emitter current.

3. The circuitry of claim 2 wherein
said means for raising the base voltage includes a resistor in the path between the emitter of said power transistor and ground and
said means responsive to the base voltage is a zener diode.

4. Electrical circuitry for generating pulses having sharp dropoff characteristics, comprising
a power transistor,
a voltage source connected to supply current through the collector-emitter circuit of said transistor,
a degenerative feedback loop connected between the emitter and the base of said transistor,
switching means connected to the base of said transistor to initiate turn-on and turn-off of said transistor, and
means for activating said loop upon initiation of turn-off,
wherein there is a base drive circuit for said transistor, and
wherein said loop includes a current transformer having a first winding connected in said collector-emitter circuit, and second and third windings connected to the base drive circuit of said transistor, whereby interrupting a base drive current in said second winding will induce a voltage drop across said third winding to actively draw current from the base of said transistor.

5. The circuitry of claim 4 wherein said means for activating said loop upon initiation of turn-off is connected between said third winding and said base drive circuit.

6. The circuitry of claim 5 wherein said means for activating said loop comprises a zener diode.

7. The circuitry of claim 6 wherein the switching voltage of said zener diode is greater than a turn-on voltage induced in said third winding upon said transistor turn-on and less than said voltage induced in said third winding upon said turn-off, and said loop is activated when said induced voltage in said third winding exceeds said switching voltage.

8. Electrical circuitry for generating pulses having sharp dropoff characteristics, comprising
a power transistor,
a voltage source connected to supply current through the collector-emitter circuit of said transistor,
a degenerative feedback loop connected between the emitter and the base of said transistor,
switching means to initiate turn-on and turn-off of said transistor,
means for activating said loop upon initiation of turn-off, and
a regenerative feedback loop connected between said emitter and base for shortening the rise time of said pulses and keeping said collector-emitter circuit in a low impedance state,
wherein said switching means is in said regenerative loop for activating the same upon initiation of turn-on.

9. The circuitry of claim 8 wherein said switching means comprises a switching transistor connected in said regenerative loop.

10. Electrical circuitry for generating pulses having sharp dropoff characteristics, comprising
a power transistor,
a voltage source connected to supply current through the collector-emitter circuit of said transistor,
a degenerative feedback loop connected between the emitter and the base of said transistor,
switching means connected to the base of said transistor to initiate turn-on and turn-off of said transistor,
means for activating said loop upon initiation of turn-off, and
a regenerative feedback loop connected between said emitter and base for shortening the rise time of said pulses and keeping said collector-emitter circuit in a low impedance state,
wherein there is a base drive circuit for said transistor, and
wherein said degenerative loop includes a current transformer having a first winding connected in said collector-emitter circuit, and second and third windings connected to the base drive circuit of said transistor, whereby the interruption of a base drive current in said second winding will induce a voltage drop across said third winding to actively draw current from the base of said transistor.

11. The circuitry of claim 10 wherein said first winding is common to said loops.

12. The circuitry of claim 11 wherein said second winding of said transformer is connected in said regenerative loop.

13. The circuitry of claim 12 further comprising a second transistor with its own degenerative and regenerative feedback loops, said transistors being connected in a push-pull amplifier configuration, said transformer having a fourth winding connected in the collector-emitter circuit of said second transistor, said second and third windings being respectively connected in the degenerative and regenerative loops of said second transistor.

14. The circuitry of claim 12 wherein said switching means comprises a switching transistor connected between said second winding and the base of said power transistor.

15. Electrical circuitry for generating pulses having sharp dropoff characteristics, comprising
a power transistor,
a voltage source connected to supply current through the collector-emitter circuit of said transistor,
a degenerative feedback loop connected between the emitter and the base of said transistor,
switching means connected to the base of said transistor to initiate turn-on and turn-off of said transistor,
means for activating said loop upon initiation of turn-off, and
a second transistor with its own degenerative feedback loop, said transistors being connected in a push-pull amplifier configuration.

* * * * *